(12) United States Patent
Lehman et al.

(10) Patent No.: US 10,019,992 B2
(45) Date of Patent: Jul. 10, 2018

(54) SPEECH-CONTROLLED ACTIONS BASED ON KEYWORDS AND CONTEXT THEREOF

(71) Applicant: Disney Enterprises, Inc., Burbank, CA (US)

(72) Inventors: Jill Fain Lehman, Pittsburgh, PA (US); Samer Al Moubayed, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 168 days.

(21) Appl. No.: 14/754,457

(22) Filed: Jun. 29, 2015

(65) Prior Publication Data
US 2016/0379633 A1     Dec. 29, 2016

(51) Int. Cl.
| | |
|---|---|
| *G10L 15/06* | (2013.01) |
| *G10L 15/00* | (2013.01) |
| *G10L 15/22* | (2006.01) |
| *G10L 15/19* | (2013.01) |
| *G10L 15/08* | (2006.01) |

(52) U.S. Cl.
CPC ............ *G10L 15/22* (2013.01); *G10L 15/19* (2013.01); *G10L 2015/088* (2013.01); *G10L 2015/223* (2013.01); *G10L 2015/227* (2013.01); *G10L 2015/228* (2013.01)

(58) Field of Classification Search
CPC ....... G10L 15/22; G10L 15/00; G10L 15/005; G10L 15/01; G10L 15/02; G10L 15/221; G10L 15/222; G10L 15/223; G10L 15/225; G10L 15/226; G10L 15/227; G10L 15/228; G10L 15/24; G10L 15/25; G10L 15/20; G10L 2015/022; G10L 2015/025; G10L 2015/027; G10L 15/083; G10L 15/086; G10L 15/1815; G10L 15/19
USPC ................. 704/275, 231–235, 246–257, 270
See application file for complete search history.

(56) References Cited

U.S. PATENT DOCUMENTS

| | | | |
|---|---|---|---|
| 7,240,006 B1 * | 7/2007 | Brocious | G06F 17/30896 704/270 |
| 8,340,975 B1 * | 12/2012 | Rosenberger | G10L 15/22 704/270 |
| 8,781,825 B2 | 7/2014 | Shaw | |
| 9,020,825 B1 * | 4/2015 | Garber | G06F 3/167 704/231 |

(Continued)

*Primary Examiner* — Vincent Rudolph
*Assistant Examiner* — Stephen Brinich
(74) *Attorney, Agent, or Firm* — Farjami & Farjami LLP

(57) ABSTRACT

A device includes a plurality of components, a memory having a keyword recognition module and a context recognition module, a microphone configured to receive an input speech spoken by a user, an analog-to-digital converter configured to convert the input speech from an analog form to a digital form and generate a digitized speech, and a processor. The processor is configured to detect, using the keyword recognition module, a keyword in the digitized speech, initiate, in response to detecting the keyword by the keyword recognition module, an action to be taken one of the plurality of components, wherein the keyword is associated with the action, determine, using the context recognition module, a context for the keyword, and execute the action if the context determined by the context recognition module indicates that the keyword is a command.

20 Claims, 3 Drawing Sheets

(56) References Cited

U.S. PATENT DOCUMENTS

| | | | |
|---|---|---|---|
| 2011/0313768 A1* | 12/2011 | Klein | G06F 3/017 704/251 |
| 2013/0090930 A1* | 4/2013 | Monson | G06F 3/167 704/275 |
| 2014/0163976 A1* | 6/2014 | Park | G10L 15/00 704/231 |

* cited by examiner

SPEECH-CONTROLLED ACTIONS BASED ON KEYWORDS AND CONTEXT THEREOF

BACKGROUND

As speech recognition technology has advanced, voice-activated devices have become more and more popular and have found new applications. Today, an increasing number of mobile phones, in-home devices, and automobile devices include speech or voice recognition capabilities. Although the speech recognition modules incorporated into such devices are trained to recognize specific keywords, they tend to be unreliable. This is because the specific keywords may appear in a spoken sentence and be incorrectly recognized as voice commands by the speech recognition module when not intended by the user. Also, in some cases, the specific keywords intended to be taken as commands may not be recognized by the speech recognition module, because the specific keywords may appear in between other spoken words, and be ignored. Both situations can frustrate the user and cause the user to give up and resort to inputting the commands manually, speak the keywords numerous times or turn off the voice recognition.

SUMMARY

The present disclosure is directed to speech-controlled actions based on keywords and context thereof, substantially as shown in and/or described in connection with at least one of the figures, as set forth more completely in the claims.

DETAILED DESCRIPTION

Figure 1:
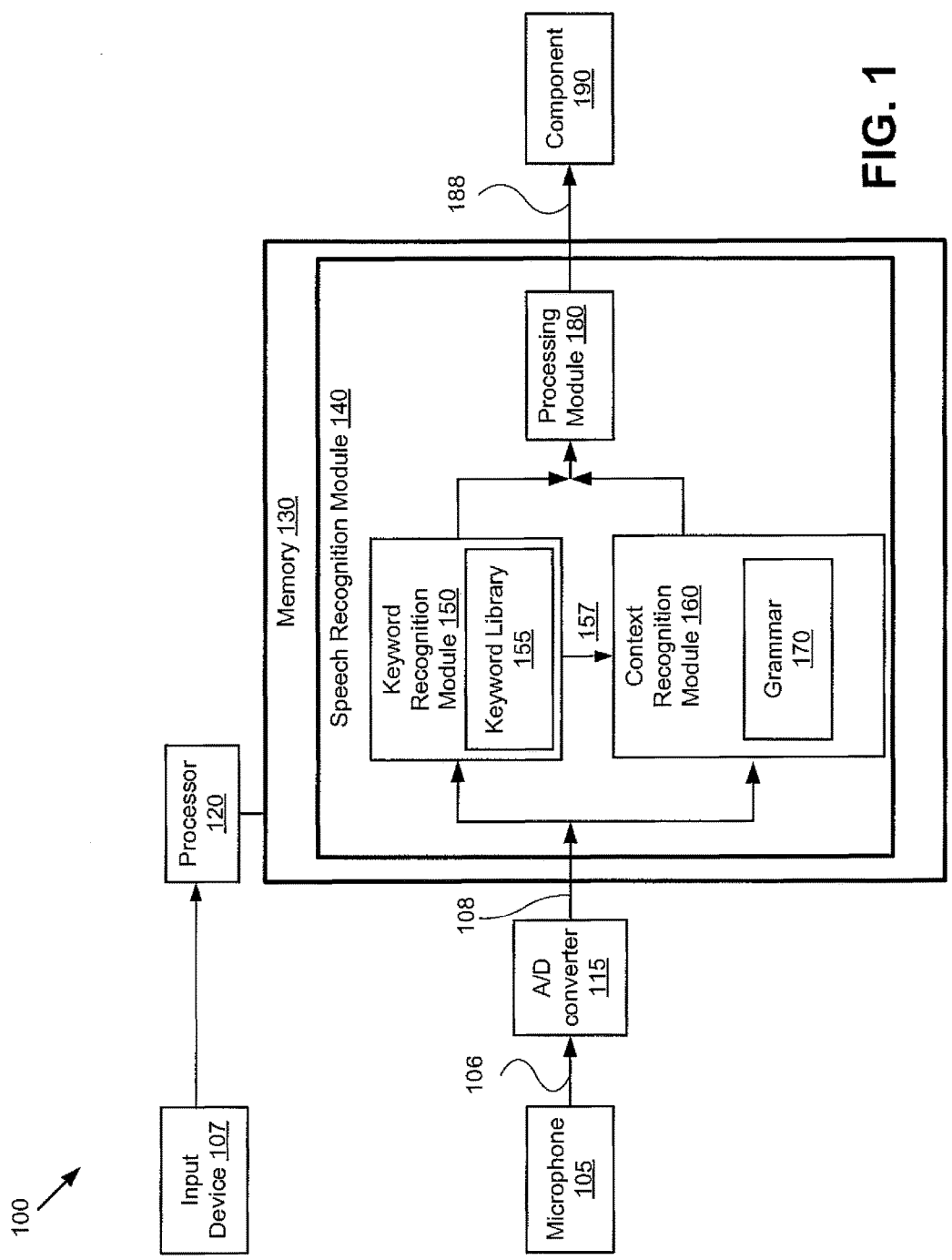
FIG. 1 shows a diagram of an exemplary device with speech recognition capability, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of device 100 with speech recognition capability, according to one implementation of the present disclosure. Device 100 includes microphone 105, input device 107, audio-to-digital (A/D) converter 115, processor 120, memory 130, and component 190. Device 100 may be a video game system, a robot, an automated appliance, such as a radio or a kitchen appliance, or any other device or equipment that can be command-controlled. For example, device 100 may be a video game system configured to receive play instructions from a user by speech or voice commands, or an oven configured to receive operating instructions by speech or voice commands.

Device 100 uses microphone 105 to receive speech or voice commands from a user. A/D converter 115 is configured to receive an input speech or audio from microphone 105, and to convert input speech 106, which is in analog form, to digitized speech 108, which is in digital form. As shown in FIG. 1, A/D converter 115 is electronically connected to speech recognition module 140, such that A/D converter 115 can send digitized speech 108 to speech recognition module 140. Using A/D converter 115, analog audio signals or input speech 106 may be converted into digital signals or digitized speech 108 to allow speech recognition module 140 to recognize spoken words and phrases. This is typically accomplished by pre-processing digitized speech 108, extracting features from the pre-processed digitized speech, and performing computation and scoring to match extracted features of the pre-processed digitized speech with keywords.

In some implementations, input device 107 may be a non-auditory input device, such as a camera, a motion sensor, a biometric sensor, etc. For example, input device 107 may be a camera that captures images of one or more participants and the environment, which are used by an image processing module (not shown) under the control of processor 120. The information related to one or more participants and the environment may be used by context recognition module 160, under the control of processor 120, to determine the context of specific keyword. For example, if the image processing module determines that the participant is facing away from device 100 while uttering the specific keyword, context recognition module 160 may inform processing module 180 that the specific keyword should not be considered a command.

In one implementation, input device 107 may be a motion sensor, which can sense movements of one or more participants using a motion sensing module (not shown) under the control of processor 120. The information related to motions of one or more participants may be used by context recognition module 160, under the control of processor 120, to determine whether a specific keyword recognized by keyword recognition module 150 should be executed by processing module 180 as a command. In yet another implementation, input device 107 may be another microphone, which can be used by context recognition module 160, under the control of processor 120, to extract additional features from the speech signal, such as pitch, prosodic contour, etc., so that context recognition module 160 may use such additional features to determine whether a detected voice command should be executed as a command by processing module 180 or not. For example, a change in pitch of the uttered word or a change in volume at which the word is uttered may also be considered by context recognition module 160. In one implementation, digitized speech 108 may be used to extract such additional features for use by context recognition module 160.

Processor 120 may be configured to access memory 130 to store received input or to execute commands, processes, or programs stored in memory 130, such as keyword recognition module 150, context recognition module 160, and processing module 180. Processor 120 may correspond to a control processing unit, such as a microprocessor or similar hardware processing device, or a plurality of hardware devices. Although FIG. 1 shows a single processor, namely processor 120, in other implementations, keyword recognition module 150, context recognition module 160, and processing module 180 may be executed by different processors. Memory 130 is a non-transitory storage device capable of storing commands, processes, data and programs for execution by processor 120. In one implementation, at least some programs and data may be stored in a cloud-based storage device. For example, in one implementation digitized speech 108 may be transmitted over a communication network, such as the Internet, to a server including speech recognition module 140 for processing digitized speech 108, and returning the result to device 100 for controlling component 190. Speech recognition module 140 includes keyword recognition module 150, context recognition module 160, and may optionally include processing module 180. Keyword recognition module 150 may include keyword library 155, and context recognition module 160 may include grammar 170.

Keyword recognition module 150 and context recognition module 160 are software algorithms for recognizing speech. Speech recognition module 140 may include different aspects of speech recognition. Keyword recognition module 150 is adapted to recognize utterances of specific keywords and context recognition module 160 is adapted to recognize the context in which a keyword is uttered. In some implementations, context recognition module 160 may determine whether or not a specific keyword recognized by keyword recognition module 150 should be considered a command or an instruction in view of the specific keyword's context as recognized by context recognition module 160. In one implementation, keyword recognition module 150 recognizes a specific keyword, and context recognition module 160 running in parallel with keyword recognition module 150, is able to recognize the context in which the specific keyword has appeared, so as to confirm the intended purpose of the specific keyword. In such an implementation, context recognition module 160 may be an independent speech recognizer, which also recognizes the specific keyword. In other implementations, context recognition module 160 may run partially in parallel with keyword recognition module 150, such that keyword recognition module 150 provides speech recognition result 157, such as the detected keyword and information related thereto, to context recognition module 160 to determine the context of the detected keyword.

For example, the word "go" may be a command intended to cause a video game to progress or a robot to move forward, or the word "go" may be part of a conversation about a trip to the store. A player of a video game whose avatar is perched on a cliff may desire the video game to distinguish between an utterance of the word "go" in a conversation about an intention to "go" to the store and an utterance of the word "go" intended to progress the video game, or an utterance by another player saying "no, don't go yet." To satisfy this need, speech recognition module 140 includes keyword recognition module 150 to detect a word or phrase that is defined as a command, and context recognition module 160 to analyze the context of that command, such as the command "go." As such, although keyword recognition module 150 detects the keyword or command "go" in the player's speech, context recognition module 160 detects the context of the word "go," which may appear in isolation (i.e., as a command) or in the player's non-command speech, such as "I will go to the store after I am done playing this video game."

Keyword recognition module 150 may be configured to recognize keywords. As shown in FIG. 1, keyword recognition module 150 includes keyword library 155, where keyword library 155 includes a plurality of keywords. Keyword recognition module 150 may be configured to detect keywords corresponding to any of the plurality of keywords in keyword library 155. Keyword library 155 may include words, or combinations of words. In some implementations, keyword library 155 may include English words, English phrases, non-English words, non-English phrases, or words and phrases in a plurality of languages.

A keyword may be a single word, a series of words, an instruction, a command, or a combination of words. A keyword may include commands or instructions, such as "go" or "jump," and may be instructions to direct a character or avatar in a video game. In some implementations, keywords may include commands or instructions to control or program an appliance, such as "preheat oven to 350°" or "tune radio to 106.7 FM," or "turn oven on at 5:30 pm, preheat to 350°."

Some devices utilizing speech recognition require a quick response when a keyword is spoken. For example, device 100 may be used to support language-based interaction between a child and a robot cooperatively playing a fast-paced video game in real-time. While playing the video game, the time between a user speaking a keyword and the implementation of an action associated with the keyword should be minimized. In some implementations, a video game may have obstacles or opponents that move across the screen towards a player's avatar, and if the obstacle or opponent contacts the character or avatar, a negative consequence may occur, such as a loss of health or death of the character in the video game. Accordingly, the user may desire a video game system that reacts quickly when the user utters a keyword intended as an instruction. In some implementations, keyword recognition module 150 may be continuously listening for keywords found in keyword library 155, and when keyword recognition module 150 detects a keyword, keyword recognition module 150 may initiate a process for executing an action associated with the detected keyword. In some implementations, keyword recognition module 150 may always be listening, even if device 100 is not actively in use. For example, a smart oven may be always on, such that a user is able to simply speak the instruction "preheat oven to 350°" to initiate preheating of the oven without first manually interacting with the oven to activate speech recognition module 140. In some implementations, keyword recognition module 150 may be continuously listening only while device 100 is in use. In some implementations, context recognition module 160 may be configured to begin listening when the speech input signal is received from the microphone.

Context recognition module 160 may be configured to analyze the context of a keyword. Such an analysis may be useful to distinguish between the video game instruction "go" and conversation about an intention to "go" to the store. The context of a keyword may include words before or after the keyword, or an absence of words before or after the keyword. To this end, context recognition module 160 may also include a voice activity detector (VAD) for detecting silence for determining a context of detected keywords. The context of a keyword is not limited to the words spoken before and after the keyword, but context may also include additional information, such as biometric data, physical gestures, and body language, which may be determined using input device 107. Additionally, context may include the location of the person speaking the keyword, which may be determined by input device 107 using proximity sensors. For example, the keyword "go" spoken by a person playing a video game system in a living room has a different context than the keyword "go" spoken by a person standing in a garage.

In some implementations, context recognition module 160 includes grammar 170. Grammar 170 may contain a plurality of rules, and each rule may define a set of constraints that context recognition module 160 uses to restrict the possible word or sentence choices while analyzing the context of a detected keyword. Grammar 170 may include properties that are specific to the grammar, such as locale, semantic format, and mode. Grammar 170 includes properties that can be set to optimize speech recognition module 140 for specific recognition environments and tasks. For example, grammar 170 may include properties that specify the language that grammar 170 contains, which of the rules of grammar 170 to apply, and the format for semantic content of grammar 170.

Processing module 180 may optionally be included as a unique component of speech recognition module 140, or may alternatively be included in keyword recognition module 150 or context recognition module 160. Processing module 180 may determine when to initiate a process for executing an action associated with a detected keyword in keyword library 155. Processing module 180 may act as a gatekeeper to determine whether to execute the action associated with the keyword. In some implementations, processing module 180 receives input from keyword recognition module 150 and context recognition module 160, and processing module 180 determines when to proceed with a process for an action associated with the keyword.

When keyword recognition module 150 detects a keyword in digitized speech 108, keyword recognition module 150 may initiate a process for executing an action associated with the detected keyword. At the same time, and in parallel with keyword recognition module 150, context recognition module 160 may detect the keyword in digitized speech 108. When context recognition module 160 detects a keyword, context recognition module 160 may analyze the context of the detected keyword. Based on the context determined by context recognition module 160, processing module 180 may determine that the detected keyword is not an instruction, but instead part of a social conversation. In this situation, processing module 180, acting as a gatekeeper, may prevent keyword recognition module 150 from initiating a process for executing a command, terminate the process if already initiated, or allow the action associated with the keyword to be executed. In some implementations, the action associated with the keyword may include sending output signal 188 to component 190, which may be a display, a robot arm, a heating part of an oven, etc.

In some implementations, device 100 may receive additional input while analyzing the context of the detected keyword. Additional input may include words spoken by other individuals in the vicinity of device 100. In some implementations, additional input may include sensory input, visual input, biometric input, or other non-verbal input. In some implementations, device 100 may include input device 107 to receive additional input. For example, input device 107 may include a camera to receive additional input related to a user's body position, or a motion detector to detect a user's motion, such as a physical gesture, when keyword recognition module 150 or context recognition module 160 detects a keyword. In some implementations, context recognition module 160 may receive this additional input to assist in determining the context of the keyword and analyze the context of the keyword based on the second input.

Component 190 may be a visual output, an audio output, a signal, or a functional, mechanical or moving element of device 100 that may be instantiated by execution of the action associated with the keyword. In some implementations, component 190 may be a display, such as a computer monitor, a television, the display of a tablet computer, the display of a mobile telephone, or any display known in the art. In some implementations, component 190 may be a speaker, such as a speaker in a home stereo, a car stereo, in headphones, in a device with a display as above, or any device having a speaker. In some implementations, component 190 may be a functional component of device 100, such as a heating element of an oven, an electric motor of a fan, a motor of an automatic door, or other device that may be found in a smart home. In some implementations, component 190 may comprise an individual component or a plurality of components.

Figure 2:
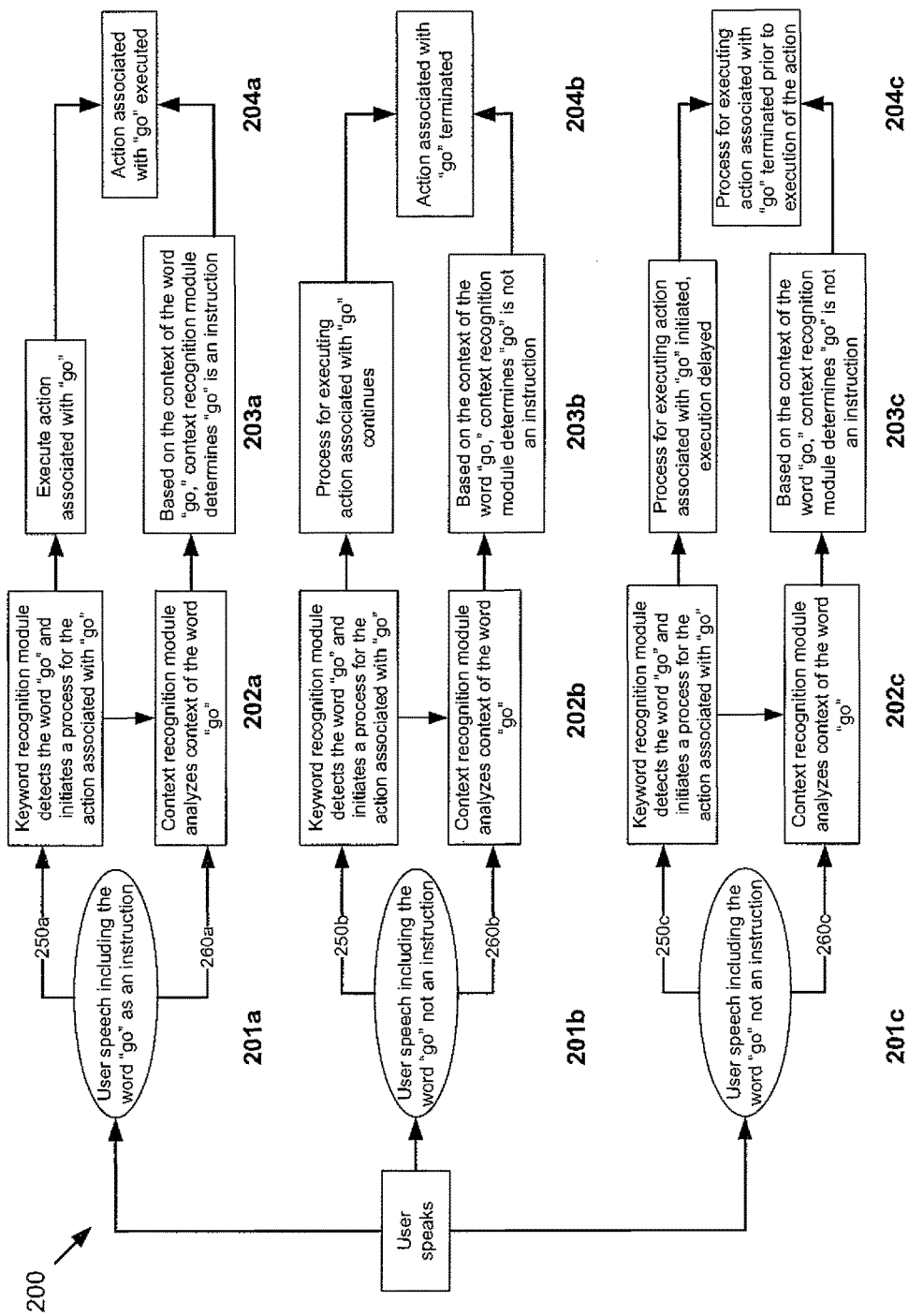
FIG. 2 shows an exemplary operational flow diagram for the device of FIG. 1 with speech recognition capability, according to one implementation of the present disclosure.

FIG. 2 shows an exemplary operational flow diagram for device 100, according to one implementation of the present disclosure. Flow diagram 200 depicts three distinct scenarios. The operational flow diagram begins with the user speaking or uttering one or more words, where 201a/201b/201c show the spoken word(s), and two outgoing arrows depict the parallel processes of keyword recognition module 150 and context recognition module 160. At 202a/202b/202c, keyword recognition module 150 and context recognition module 160 process digitized speech 108 received from A/D converter 115. At 203a/203b/203c, keyword recognition module 150 detects keywords and context recognition module 160 detects a context for the detected keywords. In some implementations, context recognition module 160 may receive speech recognition result 157 from keyword recognition module 150. In other words, context recognition module 160 may receive information from keyword recognition module 150 that a keyword has been detected. At 204a/204b/204c, processing module 180 determines whether to proceed with the execution of an action associated with detected keyword(s).

More specifically, at 201a, the user utters the word "go" intended as a command. At 202a, keyword recognition module 250a detects the keyword "go" and initiates a process for executing an action associated with the keyword "go." In one implementation, context recognition module 260a, may receive an indication from keyword recognition module 250a that the keyword "go" has been detected, and analyze the context of the keyword. In another implementation, context recognition module 260a may itself detect the keyword "go" and analyze the context of the keyword. At 203a, keyword recognition module 250a sends a signal to processing module 180 to initiate an action associated with the keyword "go." Also, context recognition module 260a analyzes a context of the keyword and determines, based on the context of the keyword, that the keyword is more likely an instruction. As a result, context recognition module 260a sends a signal to processing module 180 to proceed with executing the action. At 204a, processing module 180 proceeds with the action associated with the keyword "go" to actuate component 190.

In one implementation, context recognition module 260a may use speech recognition algorithms to determine the context for the detected keyword based on one or more words uttered before and/or after the keyword. In another implementation, context recognition module 260a may determine the context for the detected keyword based on non-verbal indicators alone, such as the location of the speaker, body language of the speaker, etc. In other implementations, context recognition module 260a may use a combination of verbal and non-verbal inputs to determine the context for the detected keyword.

Turning to another example, at 201*b*, the user utters the keyword "go," and may also utter a few other words before and/or after the keyword, where those other few words may be used determine a context for the keyword for calculating the probability of the keyword being an instruction. In some implementations, other indicators may be used, by themselves or in addition to contextual speech, to determine a context for the keyword for deciding whether the keyword should be considered an instruction or not, including non-verbal indicators such as the location of the speaker, body language of the speaker, etc. At 202*b*, keyword recognition module 250*b* detects the keyword "go" and initiates a process for executing an action associated with the keyword "go." Context recognition module 260*b*, may receive an indication from keyword recognition module 250*b* regarding the detected keyword, or in another implementation, context recognition module 260*b* may detect the keyword "go," and further analyzes the context of the keyword to determine whether or not the detected keyword should classified as a command or instruction. At 203*b*, keyword recognition module 250*b* continues the process for executing the action associated with the keyword "go," and context recognition module 260*a* determines that the detected keyword is most likely not an instruction, based on the words spoken before and after the word "go," and/or secondary input(s), such as pitch and intensity of speech, motion sensing, facial expression of the player, etc.

In response to receiving the inputs from keyword recognition module 250*b* and context recognition module 260*b*, at 204*b*, processing module 180 terminates the action associated with the keyword "go." In some implementations, termination of the action associated with the keyword may include ending the process initiated to execute the action associated with the keyword. For example, if the action were to preheat an oven to 350°, the oven may begin preheating and then the process of preheating may be terminated by turning off the heating element. In some implementations, termination of the action associated with the keyword may occur after execution of the action has occurred or begun to occur, and thus termination may include executing an action negating the action associated with the keyword. For example, if the action were to open a door, processing module 180 may terminate the action associated with the keyword "go" (terminate opening the door), and an action closing the door may be executed, thereby negating the initial action of beginning to open the door.

In another example, at 201*c*, the user utters the keyword "go. At 202*c*, keyword recognition module 250*c* detects the keyword "go," and initiates a process for an action associated with the keyword "go" to be taken by component 190. Context recognition module 260*c*, operating along with keyword recognition module 250*c*, may also detect the keyword "go," or may receive an indication from keyword recognition module 250*c* that the keyword "go" has been detected. In response, context recognition module 260*c* determines the context of the keyword. As explained above, the context for the detected keyword may be determined using only one or a combination of inputs or factors. For example, a VAD may be used determine whether there is additional speech before and/or after the detected keyword. In one implementation, detection of additional speech may indicate a lower likelihood for the detected keyword being an instruction. In another example, grammar 170 of context recognition module 260*c* may analyze additional speech before and/or after the detected keyword to determine the likelihood of the detected keyword being an instruction. As an example, whether the keyword "go" appears in "go for it" or "I want to go to the store now." Context recognition module 260*c* may also analyze non-verbal indicators such as the location of the speaker, body language of the speaker, facial expression, movement, etc.

In the example of 203*c*, keyword recognition module 250*c* continues the process for executing the action associated with the keyword "go," and context recognition module 260*c* determines, based on the context of the keyword, that the keyword is more likely not an instruction. As such, at 204*c*, processing module 180 may terminate the process for executing the action associated with the keyword "go" before execution of the action by component 190 has begun.

Figure 3:
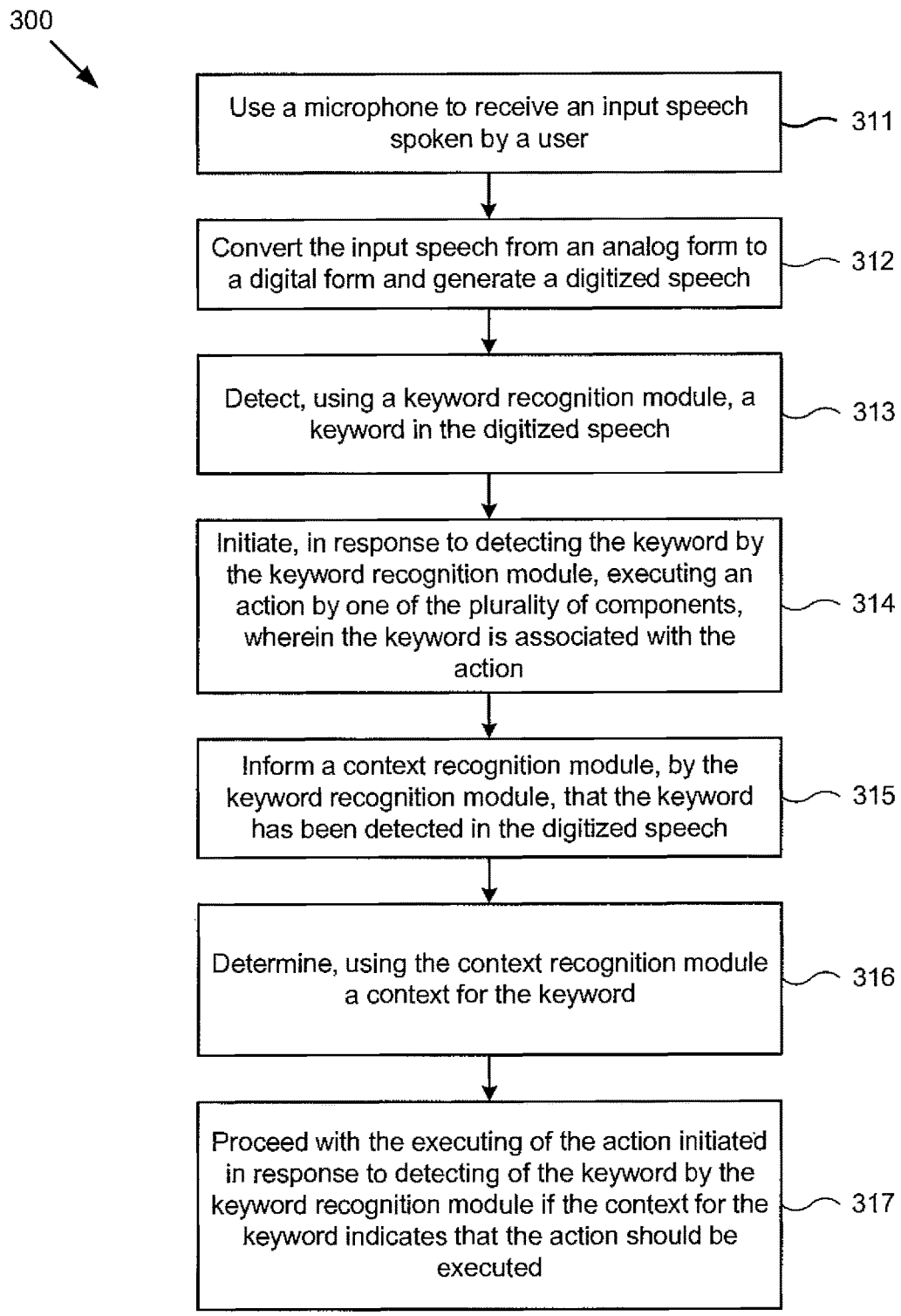
FIG. 3 shows a flowchart illustrating an exemplary speech recognition method for use by the device of FIG. 1, according to one implementation of the present disclosure.

FIG. 3 shows a flowchart illustrating exemplary speech recognition method 300 for use by device 100, according to one implementation of the present disclosure. As shown in FIG. 3, at 311, device 100 uses microphone 105 to receive input speech 106 spoken by a user. In one implementation, the microphone may be a peripheral device electronically connected to device 100. In some implementations, device 100 may use an array of microphones to determine the location from which speech originates. For example, a video game system having an array of microphones may be able to distinguish between speech coming from a player and speech coming from a person in another room.

At 312, device 100 uses A/D converter 115 to convert input speech 106 from an analog form to a digital form, and generates digitized speech 108. To convert the signal from analog to digital form, the A/D converter samples the analog signal at regular intervals and sends digitized speech 108 to speech recognition module 140.

At 313, keyword recognition module 150 detects a keyword in input speech 106. In some implementations, keyword recognition module is continuously listening for instances of keywords, and in other implementation, keyword recognition module 150 may include a VAD, such that the keyword recognition module 150 begins listening for instances of keywords when speech is detected. A keyword may be a word or series of words associated with an action. In some implementations, keyword recognition module 150 includes keyword library 155 which may include a plurality of keywords. Each keyword of keyword library 155 may be associated with a particular action. To detect a keyword in digitized speech 108, keyword recognition module 150 may pre-process digitized speech 108, extract features from the pre-processed digitized speech, and perform computation and scoring to match extracted features of the pre-processed digitized speech with keywords in keyword library 155.

At 314, keyword recognition module 150, in response to detecting a keyword in digitized speech 108, initiates a process for executing an action associated with the keyword. In some implementations, once keyword recognition module 150 initiates the process, processor 120 executes the action associated with the keyword with substantially no delay, other than the inherent delay of communicating signals within device 100. However, in some implementations, when keyword recognition module 150 initiates the process for executing an action associated with the keyword, execution of the action is delayed awaiting a determination by context recognition module 160 that the detected keyword is an instruction.

At 315, keyword recognition module 150 informs context recognition module 160 that digitized speech 108 includes the keyword. In some implementations, context recognition module 160 may independently determine that digitized speech 108 includes the keyword.

At 316, context recognition module 160 determines a context for the keyword. Determining the context for the keyword may be based on words before and/or after the detected keyword in input speech 106. For example, if context recognition module 160 determines the keyword to be a stand-alone word without any speech before or after the instruction keyword, the keyword is likely to be classified as an instruction. Context recognition module 160 may use a VAD to determine if there is any speech before or after the uttered keyword. In one implementation, the context may also include other sensory input, such as visual input, biometric input, or other non-verbal or verbal input. For example, context recognition module 160 may determine the keyword is less likely to be a command if the visual input indicates that the user is not facing the device. Further, context recognition module 160 may analyze the keywords appearing before and/or after the keyword using grammar 170, and additional factors, such as silence detection, location of the speaker, facial expression of the speaker, gesture and movements of the speaker, etc., to determine whether the keyword is more likely or less likely to be an instruction in view of the context.

Context recognition module 160 may also include grammar 170 for determining the context for uttered keywords based on the speech spoken before or after the uttered keywords. In one implementation, grammar 170 may independently detect keywords in speech, and may include keywords similar to those of keyword library 155 or more. Grammar 170 may contain a plurality of rules, where each rule defines a set of language constraints that context recognition module 160 uses to restrict possible word or sentence choices while determining the context for keywords that are designated as instructions or commands in context recognition module 160. Grammar 170 may include properties that can be set to optimize speech recognition module 140 for specific recognition environments and tasks. For example, grammar 170 may include properties that specify the language for grammar 170, which grammar 170 rules to use, and the format or semantic content for grammar 170.

Further, context recognition module 160 may use a VAD for silence and voice detection to determine if there is any speech before or after the uttered keyword. In one implementation, the context may also include other sensory input, such as visual input, biometric input, or other non-verbal or verbal input. For example, context recognition module 160 may determine the keyword is less likely to be a command if the visual input indicates that the user is not facing the device.

At 317, device 100 may proceed with the process of executing an action associated with the keyword if the context does not reject or does confirm execution of the action. In some implementations, context recognition module 160 determines the detected keyword is less likely or more likely to be a command or instruction based on the context. For example, based on the context, context recognition module 160 may determine a probability that the keyword is intended as an instruction, such as a 10%, 20%, 30% chance, etc. that the keyword is intended as an instruction.

From the above description, it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A device comprising:
a plurality of components;
a memory including a keyword recognition module and a context recognition module;
a microphone configured to receive an input speech spoken by a user;
an analog-to-digital converter configured to convert the input speech from an analog form to a digital form and generate a digitized speech;
a processor configured to:
detect, using the keyword recognition module, a keyword in the digitized speech based on features extracted from the digitized speech;
initiate, in response to detecting the keyword by the keyword recognition module, an action to be taken by one of the plurality of components, wherein the keyword is defined as a command to take the action;
determine, using the context recognition module and after detecting the keyword, a context for the keyword based on additional features extracted from a portion of the digitized speech before and/or after the keyword, wherein the context is used to determine whether or not the keyword should be considered to be the command; and
execute the action if the context determined by the context recognition module indicates that the keyword should be considered to be the command.

2. The device of claim 1, wherein the context recognition module utilizes a voice activity detector to determine the context.

3. The device of claim 1, wherein the keyword recognition module is continuously listening for the keyword and the context recognition module is configured to begin listening when the input speech is received from the microphone.

4. The device of claim 1, wherein the processor is configured to:
prior to determining the context of the keyword, receive one or more second inputs from the user; and
analyze the context of the keyword based on the one or more second inputs.

5. The device of claim 4, wherein the one or more second inputs is a non-verbal input including a physical gesture.

6. The device of claim 4, wherein the one or more second inputs are received from one of a motion sensor and a video camera.

7. The device of claim 1, wherein the context recognition module determines that the keyword is in the digitized speech based on an indication received from the keyword recognition module.

8. The device of claim 1, wherein the context of the keyword includes a location of the user.

9. The device of claim 1, wherein the processor is further configured to:
display a result of executing the action on a display.

10. The device of claim 1, wherein the processor is further configured to:
terminate the action if the context determined by the context recognition module indicates that the keyword should not be considered to be the command.

11. A method for speech recognition by a device having a microphone, a processor, and a memory including a keyword recognition module and a context recognition module, the method comprising:

detecting, using the keyword recognition module, a keyword in a digitized speech based on features extracted from the digitized speech;

initiating, in response to detecting the keyword by the keyword recognition module, an action to be taken by one of the plurality of components, wherein the keyword is defined as a command to take the action;

determining, using the context recognition module and after detecting the keyword, a context for the keyword based on additional features extracted from a portion of the digitized speech before and/or after the keyword, wherein the context is used to determine whether or not the keyword should be considered to be the command; and executing the action if the context determined by the context recognition module indicates that the keyword should be considered to be the command.

12. The method of claim 11, wherein the context recognition module utilizes a voice activity detector to determine the context.

13. The method of claim 11, wherein the keyword recognition module is continuously listening for the keyword and the context recognition module is configured to begin listening when the input speech is received from the microphone.

14. The method of claim 11, further comprising:

prior to determining the context of the keyword, receiving one or more second inputs from the user; and analyzing the context of the keyword based on the one or more second inputs.

15. The method of claim 14, wherein the one or more second inputs include a non-verbal input including a physical gesture.

16. The method of claim 14, wherein the one or more second inputs are received from one of a motion sensor and a video camera.

17. The method of claim 11, wherein the context recognition module determines that the keyword is in the digitized speech based on an indication received from the keyword recognition module.

18. The method of claim 11, wherein the context of the keyword includes a location of a user.

19. The method of claim 11 further comprising:

terminating the action if the context determined by the context recognition module indicates that the keyword should not be considered to be the command.

20. A device comprising:

a plurality of components;

a memory including a keyword recognition module and a context recognition module;

a microphone configured to receive an input speech spoken by a user;

an analog-to-digital converter configured to convert the input speech from an analog form to a digital form and generate a digitized speech;

a processor configured to:

detect, using the keyword recognition module, a keyword in the digitized speech based on features extracted from the digitized speech;

initiate, in response to detecting the keyword by the keyword recognition module, an action to be taken by one of the plurality of components, wherein the keyword is defined as a command to take the action;

determine, using the context recognition module and after detecting the keyword, a context for the keyword based on additional features extracted from the digitized speech before and after the keyword, wherein the context is used to determine whether or not the keyword should be considered to be the command;

execute the action if the context determined by the context recognition module indicates that the keyword should be considered to be the command; and terminate the action if the context determined by the context recognition module indicates that the keyword should not be considered to be the command.

* * * * *